US010340805B2

(12) United States Patent
Kovacevic et al.

(10) Patent No.: US 10,340,805 B2
(45) Date of Patent: *Jul. 2, 2019

(54) RESONANT STEP DOWN DC-DC POWER CONVERTER AND METHODS OF CONVERTING A RESONANT STEP DOWN DC-DC CONVERTER

(71) Applicant: Danmarks Tekniske Universitet, Kgs. Lyngby (DK)

(72) Inventors: Milovan Kovacevic, Kgs. Lyngby (DK); Mickey P. Madsen, Kgs. Lyngby (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 157 days.

This patent is subject to a terminal disclaimer.

(21) Appl. No.: 15/103,819

(22) PCT Filed: Jan. 20, 2015

(86) PCT No.: PCT/EP2015/051007
§ 371 (c)(1),
(2) Date: Jun. 10, 2016

(87) PCT Pub. No.: WO2015/110427
PCT Pub. Date: Jul. 30, 2015

(65) Prior Publication Data
US 2016/0322910 A1     Nov. 3, 2016

(30) Foreign Application Priority Data

Jan. 22, 2014 (EP) .................................... 14152070

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 1/4241* (2013.01);
(Continued)

(58) Field of Classification Search
CPC .. H02M 3/33523; H02M 1/08; H02M 1/4241; H02M 3/33576; H02M 2001/0058
See application file for complete search history.

(56) References Cited

U.S. PATENT DOCUMENTS 5,770,911 A * 6/1998 Cheng ...................... H01L 35/00
136/205
2004/0130913 A1* 7/2004 Giandalia ............... H01F 19/08
363/16
(Continued)

FOREIGN PATENT DOCUMENTS

JP   H04-64461 A    2/1992
JP   H04-285468 A   10/1992
(Continued)

OTHER PUBLICATIONS

Guo, Jason "A HV Input High Frequency Non-Isolated DC/DC Converter" Pesc '03. 2003 IEEE 34th annual Power Electronics Specialists Conference, Acapulco, Mexico, Jun. 15-19, 2003, (Annual Power Electronics Specialists Conference), pp. 1390-1395, vol. 3.
(Continued)

*Primary Examiner* — Jue Zhang
*Assistant Examiner* — Lakaisha Jackson
(74) *Attorney, Agent, or Firm* — Knobbe Martens Olson & Bear, LLP

(57) ABSTRACT

The present invention relates to a resonant step-down DC-DC power converter which comprises a primary side circuit and a secondary side circuit coupled through a galvanic isolation barrier. The primary side circuit comprises a posi- (Continued)

tive and a negative input terminal for receipt of an input voltage and an input capacitor coupled between the positive and negative input terminals and the secondary side circuit comprises an output capacitor chargeable to a converter output voltage between a first positive electrode and a second negative electrode. A resonant network is configured for alternatingly being charged from the input voltage and discharged to the output capacitor through the galvanic isolation barrier by a semiconductor switch arrangement in accordance with a switch control signal to produce the converter output voltage. The resonant step-down DC-DC power converter comprises an electrical short-circuit connection across the galvanic isolation barrier connecting, in a first case, the second negative electrode of the output capacitor to the positive input terminal of the primary side circuit or, in a second case, connecting the second positive electrode of the output capacitor to the negative input terminal of the primary side circuit thereby establishing in both the first and second cases a series coupling of the output capacitor and the input capacitor. A load connection is established, in the first case, between the first positive electrode of the output capacitor and the positive input terminal or, in the second case, between the second negative electrode of the output capacitor and the negative input terminal.

21 Claims, 7 Drawing Sheets

(51) Int. Cl.
　　　H02M 1/42　　(2007.01)
　　　H05B 33/08　　(2006.01)
　　　H02M 1/00　　(2006.01)
(52) U.S. Cl.
　　　CPC .... H02M 3/33576 (2013.01); H05B 33/0815 (2013.01); *H02M 2001/0058* (2013.01); *Y02B 70/1433* (2013.01); *Y02B 70/1491* (2013.01)

(56) References Cited

U.S. PATENT DOCUMENTS

| | | |
|---|---|---|
| 2004/0264214 A1 | 12/2004 | Xu et al. |
| 2005/0156699 A1* | 7/2005 | Hui .................... H01F 17/0006 336/200 |
| 2009/0001955 A1* | 1/2009 | Yoshida ................ H02M 3/005 323/282 |
| 2012/0087620 A1 | 4/2012 | Pardo et al. |
| 2012/0229098 A1 | 9/2012 | Krauer et al. |
| 2012/0249189 A1* | 10/2012 | Frattini .............. H03K 17/6872 327/109 |
| 2012/0287678 A1 | 11/2012 | Xu et al. |
| 2013/0049918 A1* | 2/2013 | Fu ............................. H01F 3/12 336/220 |
| 2013/0250627 A1* | 9/2013 | Herfurth ............. H02M 3/3376 363/21.15 |
| 2014/0204571 A1* | 7/2014 | Zhang ................ H05B 33/0809 362/222 |
| 2014/0232359 A1* | 8/2014 | Dash ..................... H02M 3/158 323/235 |
| 2015/0084718 A1* | 3/2015 | Maxim ............... H01F 17/0013 333/174 |
| 2016/0099651 A1* | 4/2016 | Ishigaki ............ H02M 3/33584 363/21.05 |

FOREIGN PATENT DOCUMENTS

| | | |
|---|---|---|
| JP | H10-234178 A | 9/1998 |
| JP | 2001-345189 A | 12/2001 |
| JP | 2012-191841 A | 10/2012 |
| TW | 201246771 A | 11/2012 |

OTHER PUBLICATIONS

Guo, Jason "Double-Ended Transformer-Based Multi-Phase Converters" Intelec 2003. 25th International Telecommunications Energy Conference, Yokohama, Japan, Oct. 19-23, 2003, pp. 104-109.

Lu, Dylan D.C. et al; "A High Step-up, Non-isolated DC-DC Converter with Reduced Repeated Power Processing" 2010 International Power Electronics Conference: IPEC-Sapporo 2010—(ECCE Asia), Sapporo, Japan, Jun. 21, 2010, pp. 2897-2904.

Yang, Zhihua et al., "A New Transformer-Based Non-isolated Topology Optimized for VRM Application" Power Electronics Specialists Conference, PESC '05. IEEE 36th, Jan. 1, 2005, pp. 447-453.

Ye, Sheng et al., "A Novel Non-Isolated Full Bridge Topology for VRM Applications". IEEE Transactions on Power Electronics, Jan. 2008, pp. 427-437, vol. 23, No. 1.

International Search Report for PCT/EP2015/051007 dated Jun. 16, 2015.

* cited by examiner

RESONANT STEP DOWN DC-DC POWER CONVERTER AND METHODS OF CONVERTING A RESONANT STEP DOWN DC-DC CONVERTER

CROSS REFERENCE TO RELATED APPLICATIONS

This application is a U.S. National Phase Application of PCT International Application Number PCT/EP2015/051007, filed on Jan. 20, 2015, designating the United States of America and published in the English language, which is an International Application of and claims the benefit of priority to European Patent Application No. 14152070.0, filed on Jan. 22, 2014. The disclosures of the above-referenced applications are hereby expressly incorporated by reference in their entireties.

The present invention relates to a resonant step-down DC-DC power converter which comprises a primary side circuit and a secondary side circuit coupled through a galvanic isolation barrier. The primary side circuit comprises a positive and a negative input terminal for receipt of an input voltage and an input capacitor coupled between the positive and negative input terminals and the secondary side circuit comprises an output capacitor chargeable to a converter output voltage between a first positive electrode and a second negative electrode. A resonant network is configured for alternatingly being charged from the input voltage and discharged to the output capacitor through the galvanic isolation barrier by a semiconductor switch arrangement in accordance with a switch control signal to produce the converter output voltage. The resonant step-down DC-DC power converter comprises an electrical short-circuit connection across the galvanic isolation barrier connecting, in a first case, the second negative electrode of the output capacitor to the positive input terminal of the primary side circuit or, in a second case, connecting the second positive electrode of the output capacitor to the negative input terminal of the primary side circuit thereby establishing in both the first and second cases a series coupling of the output capacitor and the input capacitor. A load connection is established, in the first case, between the first positive electrode of the output capacitor and the positive input terminal or, in the second case, between the second negative electrode of the output capacitor and the negative input terminal.

BACKGROUND OF THE INVENTION

Power density and component costs are key performance metrics of both isolated and non-isolated DC-DC power converters to provide the smallest possible physical size and/or lowest costs for a given output power requirement or specification. Resonant power converters are particularly useful for high switching frequencies such as frequencies above 1 MHz where switching losses of standard SMPS topologies (Buck, Boost etc.) tend to be unacceptable for conversion efficiency reasons. High switching frequencies are generally desirable because of the resulting decrease of the electrical and physical size of circuit components of the power converter like inductors and capacitors. The smaller components allow increase of the power density of the DC-DC power converter. In a resonant power converter an input "chopper" semiconductor switch (often MOSFET or IGBT) of the standard SMPS is replaced with a "resonant" semiconductor switch. The resonant semiconductor switch relies on resonances of circuit capacitances and inductances to shape the waveform of either the current or the voltage across the semiconductor switch such that, when state switching occurs in the semiconductor switch, there is essentially no current through or essentially no voltage across the semiconductor switch. Hence power dissipation is largely eliminated in at least some of the intrinsic capacitances or inductances of the input semiconductor switch such that a marked increase of the switching frequency becomes feasible for example to values above 10 MHz. This concept is known in the art under designations like zero voltage and/or zero current switching (ZVS and/or ZCS) operation. Commonly used switched mode power converters operating under ZVS and/or ZCS are often described as class E, class F or class DE inverters or power converters.

In view of the above, it remains a challenge to reduce the size and lower the component costs of both isolated and non-isolated DC-DC power converters. Hence, novel resonant step-down DC-DC power converter topologies which reduce the required maximum voltage or power rating of active and passive components of the resonant DC-DC converter are highly desirable. Likewise, novel resonant step-down DC-DC power converter topologies which reduce the physical size or cost of active and passive components for example inductors, capacitors, transistors and diodes are highly desirable.

SUMMARY OF THE INVENTION

A first aspect of the invention relates to a resonant step-down DC-DC power converter comprising a primary side circuit and a secondary side circuit coupled through a galvanic isolation barrier; the primary side circuit comprises a positive input terminal and a negative input terminal for receipt of an input voltage. An input capacitor is coupled or connected between the positive and negative input terminals on the primary side circuit. The secondary side circuit comprising an output capacitor chargeable to a converter output voltage between a first positive electrode and a second negative electrode of the output capacitor. The resonant step-down DC-DC power converter comprises a resonant network configured for alternatingly being charged from the input voltage and discharged to the output capacitor through the galvanic isolation barrier by a semiconductor switch arrangement in accordance with a switch control signal to produce the converter output voltage, wherein a frequency of the switch control signal has a frequency at or above 20 MHz, more preferably at or above 30 MHz. An electrical short-circuit connection across the galvanic isolation barrier connects, in a first case, the second negative electrode of the output capacitor to the positive input terminal of the primary side circuit or, in a second case, connects the second positive electrode of the output capacitor to the negative input terminal of the primary side circuit thereby establishing in both the first and second cases a series coupling of the output capacitor and the input capacitor. A load connection of the resonant step-down DC-DC power converter exists or is established, in the first case, between the first positive electrode of the output capacitor and the positive input terminal or, in the second case, between the second negative electrode of the output capacitor and the negative input terminal.

The present invention is described in detail in the following with reference to specific implementations derived from isolated resonant DC-DC power converters of class E, class DE and SEPIC topologies. The skilled person will understand that the invention is equally applicable to other types of isolated resonant DC-DC power converters such as class φ₂ (EF₂) inverters and rectifiers and resonant boost, buck, LCC converters etc. In this context the term DC can refer to a slowly varying input voltage where the term "DC" applies to variations of the input voltage level which are slow compared to a switching frequency, i.e. the above-mentioned frequency of the switch control signal, of the resonant step-down DC-DC power converter. The input voltage may accordingly comprise a substantially constant DC input voltage or a rectified AC voltage comprising a DC voltage component and an AC voltage component at a frequency significantly lower, for example more than 100 times lower, than the switching frequency of the resonant step-down DC-DC power converter. In the latter case, the input voltage may be supplied by an output of a 50/60 Hz mains voltage rectifier connected to the positive and negative input terminals of the resonant step-down DC-DC power converter.

The secondary side circuit of the resonant step-down DC-DC power converter may comprise a rectification circuit coupled between the resonant network and the output capacitor to convert a resonant AC voltage waveform of the resonant circuit into a DC converter output voltage.

The semiconductor switch arrangement preferably comprises one or more individual semiconductor switches configured for zero-voltage-switching and/or zero-current-switching. The present resonant step-down DC-DC power converters can be operated at very high switching frequencies, i.e. at or above the 20 MHz or 30 MHz, because the zero-voltage-switching and/or zero-current-switching of the one or more individual controllable semiconductor switches facilitated by the resonant network effectively reduces switching power losses of the semiconductor switch arrangement. A switching frequency at or above 30 MHz is normally considered as VHF operation of the resonant step-down DC-DC power converter.

The semiconductor switch arrangement may comprise various ordinary switch topologies such as single switch topologies, half-bridge switch topologies or full-bridge switch topologies. The one or more individual controllable semiconductor switches of the semiconductor switch arrangement may comprise a MOSFET or IGBT such as a Gallium Nitride (GaN) or Silicon Carbide (SiC) transistor. A control terminal, e.g. a gate or base, of each of the controllable semiconductor switches may be coupled to, and driven by, the switch control signal to alternatingly force each of the controllable semiconductor switches between on-states and off-states. In the on-state an inductor of the resonant network may be charged with energy from the input voltage source and in the following off-state release stored energy to the output capacitor to charge the latter. The resonant network preferably comprises at least one inductor and at least one capacitor where one or both of these components may comprise parasitic inductances or capacitances of active components or passive components of the resonant step-down DC-DC power converter. The secondary side circuit of the resonant step-down DC-DC converter may comprise one or more passive and/or active rectifying element(s) such as a diode or transistor inserted in front of the converter load.

The electrical connection of an input voltage or power source, e.g. a DC voltage generator, to the present resonant step-down DC-DC power converter is in the first case made between the negative input terminal of the primary side circuit and the positive electrode of the output capacitor such that the input and output capacitors of the converter are connected in series between the positive and negative terminals of the input voltage or power source. Likewise, in the second case the input voltage or power source is connected between the negative electrode of the output capacitor and the positive input terminal of the primary side circuit such that the input and output capacitors of the converter once again are connected in series between the positive and negative terminals of the input voltage or power source.

The skilled person will understand that the electrical short-circuit connection across the galvanic isolation barrier eliminates the galvanic isolation between the primary and secondary side circuits of the resonant step-down DC-DC converter by interconnecting the second, negative, electrode of the output capacitor and the positive input terminal in the first case or the first, positive, electrode of the output capacitor and the negative input terminal in the second case. However, the electrical short-circuit connection provides numerous new benefits to the resonant step-down DC-DC converter as a whole and the lack of galvanic isolation is acceptable in numerous areas of applications where the converter circuit remains isolated from users such as retrofit LED bulbs and tubes. The series connection of the output and input capacitors between the input voltage/power source terminals established by the electrical short-circuit connection has several advantageous effects. Input current flowing through the input capacitor to charge this to the input voltage is also forced to flow through the output capacitor and charges the output capacitor such that energy or power is transferred directly from the input/primary side to the output/secondary side of the resonant step-down DC-DC converter. Hence, less power or energy needs to be transferred through the resonant network and the isolation barrier for a given output power of the converter as explained in further detail below with reference to the resonant step-down DC-DC converter embodiments of FIGS. 1A), 1B) and 1C). The reduced amount of power transferred to the secondary side circuitry through the resonant network and isolation barrier reduces power losses of or in the resonant step-down DC-DC converter. This advantage is obtained because the direct energy or power transfer between the input and output capacitors of the converter leads to a lower power loss than the ordinary transfer of energy or power through the resonant network.

Furthermore, the reduced amount of power which needs to be transferred through the resonant step-down DC-DC converter leads to reduced power handling requirements for both passive and active components, e.g. semiconductors switches, capacitors, diodes etc., allowing less costly and physically smaller components to be applied. A yet further significant advantage of the present resonant step-down DC-DC converter is that the primary side circuit is only subjected to the input voltage between the positive and negative input terminals of the primary side circuit instead of the entire converter input voltage supplied by the external input voltage or power source as in ordinary isolated DC-DC power converters. As described above, the input voltage or power source is connected either between the negative input terminal and the positive electrode of the output capacitor or, in the second case, between the negative electrode of the output capacitor and the positive input terminal of the primary side circuit in the present resonant step-down DC-DC converter. The reduced voltage levels in the primary side circuit of the resonant step-down DC-DC power converter reduce the required maximum voltage ratings of active and passive components therein such as semiconductor switch or switches, inductor(s), capacitors, diode(s) etc. The reduced maximum voltage rating leads to physically smaller and/or less costly active and passive components with increased life span.

The galvanic isolation barrier may comprise a transformer which comprises a pair of electro-magnetically or magnetically coupled inductors comprising a first inductor electrically connected to the primary side circuit and a second inductor electrically connected to the secondary side circuit. The first and second inductors could be discrete windings both wound around a common magnetic permeable structure to form an isolation transformer. In one alternative embodiment, the first and second inductors are arranged to be electro-magnetically coupled without a common magnetically permeable structure to form a coreless isolation transformer. In such a coreless isolation transformer, the first and second inductors may be integrated in a printed circuit board without intervening magnetic material. The printed circuit board could have the entire resonant step-down DC-DC power converter mounted thereon. The first and second inductors are preferably arranged such that a magnetic coupling factor, k, between the first and second inductors is larger than 0.25. The first and second inductors of the coreless isolation transformer may for example comprise first and second embedded coils, respectively, formed in one or more conductive layers of the printed circuit board as disclosed in the applicant's co-pending application No. PCT/EP2014/079037.

In yet another embodiment, the galvanic isolation barrier comprises a first capacitor coupled in series with the positive input terminal of the primary side circuit and the first positive electrode of the output capacitor and a second capacitor coupled in series with the negative input terminal of the primary side circuit and the second negative electrode of the output capacitor. This embodiment is particularly advantageous in connection with the high switching frequency of the present resonant step-down DC-DC power converter where the power loss in the above-discussed common magnetic permeable structure of the transformer often will be unacceptable because of the accompanying decrease of power conversion efficiency of the resonant power converter. The capacitor based galvanic isolation barrier becomes particularly advantageous as the capacitance of each of the first and second (isolation) capacitors can be small, such as less than 100 nF for example smaller than 1 nF such as about 100 pF. Such isolation capacitors may be formed by SMD mounted ceramic capacitors with a very small footprint e.g. a footprint less than 2 $cm^2$ for example a footprint down to or less than about 5 $mm^2$.

The high switching frequency of the present resonant step-down DC-DC power converter, i.e. at or above 20 MHz, also makes the capacitance of each of the input and output capacitors to be small compared to conventional non-resonant DC-DC power converters operating below 1 MHz. Hence, neither the input capacitor nor the output capacitor needs to be an electrolytic capacitor which generally is plagued by relatively low reliability and short-life span instead the first and second isolation capacitors and/or the input and output capacitors of the present resonant step-down DC-DC power converter can be reliable, physically small and inexpensive. The skilled person will understand that the input and output capacitors may be formed exclusively by parasitic capacitances associated with the primary side circuit and the secondary side circuit, respectively.

Another advantage of the high switching frequency of the present resonant step-down DC-DC power converter, as set by the switch control signal, is a marked size decrease of an EMI filter that may be placed in front of the positive and negative input terminals of present converter. The size decrease of the EMI filter is possible because ripple voltage components on the input voltage induced by the switching activity of the present resonant power converter are located around the switching frequency of converter, i.e. around or above 20 MHz, where the necessary filter components of the EMI filter can be physically small.

The skilled person will appreciate that a practical embodiment of the electrical short circuit connection will possess a finite DC resistance. An upper limit of this finite DC resistance will vary depending on input/output voltage and/or current requirements of the resonant step-down DC-DC power converter. The electrical short-circuit connection may possess a DC resistance of less than 1 kΩ, even more preferably less than 100Ω, such as less than 10Ω. In other embodiments, the electrical short circuit connection may have a unidirectional resistance such that the DC resistance only falls below the above-mentioned upper limits in one direction and exhibits a much larger DC resistance in the opposite direction, i.e. a diode characteristic for example provided by a diode element or a controlled semiconductor switch such as a MOSFET.

One embodiment of the resonant step-down DC-DC power converter is based on a Class E converter and the resonant network comprises first and second series connected inductors which are connected in series with the positive input terminal. A semiconductor switch is arranged with a first switch node connected between a mid-point node between the first and second series connected inductors and a second switch node connected to the negative input terminal of the primary side circuit. A control terminal of the semiconductor switch is connected to the switch control terminal. A rectifying or rectification circuit of the resonant step-down DC-DC power is connected between the first and second capacitors of the galvanic isolation barrier and the first positive electrode and the second negative electrode of the output capacitor. The rectifying circuit may comprise a semiconductor diode or a synchronous semiconductor switch coupled, i.e. electrically connected, to a third inductor of the resonant step-down DC-DC power converter.

Another embodiment of the resonant step-down DC-DC power converter is based on a converter topology wherein the first and second inductors of the isolation transformer are integrated in the resonant network. The first inductor is arranged with a first inductor end connected to the positive input voltage terminal and a second inductor end connected to a first node of a semiconductor switch such as a drain terminal of a MOSFET switch. A second node of the semiconductor switch is connected to the negative input terminal of the primary side circuit. The second inductor comprises a first inductor end connected to the first capacitor of the isolation barrier and a second inductor end connected to the second capacitor of the isolation barrier. A rectifying circuit is connected across the second inductor between the first and second capacitors of the galvanic isolation barrier and the first positive electrode and the second negative electrode of the output capacitor.

One embodiment of the resonant step-down DC-DC power converter comprises a mode switching feature that is accompanied with several advantages such as increases a dynamic voltage operating range and/or improving a power factor (PF) of the resonant power converter as discussed in additional detail below with reference to the appended drawings. This embodiment of the resonant step-down DC-DC power converter further comprises:

a rectifying element, such as a diode or a controlled semiconductor switch such as a MOSFET, configured to:

in the first case conduct current from the positive input terminal to the second negative electrode of the output capacitor in the second case, conduct current from the negative input terminal to the first positive electrode of the output capacitor; and a mode selecting semiconductor switch configured to selectively break and close an electrical connection between the negative input terminal and the second negative electrode of the output capacitor, such that:

in a first mode of the resonant step-down DC-DC power converter, establishing the series connection of the output capacitor and the input capacitor through the rectifying element and in a second mode of the resonant step-down DC-DC power converter, opening or breaking the series coupling of the output capacitor and the input capacitor.

The skilled person will appreciate that each of the present resonant step-down DC-DC power converters may be constructed by conversion of an isolated resonant DC-DC power converter with a corresponding topology as described in additional detail below with reference to FIGS. 2A)-2B) FIGS. 3A)-3B) and FIGS. 4A)-4B). Hence, a second aspect of the invention relates to a method of converting a resonant DC-DC power converter to a non-isolated/uninsulated resonant step-down DC-DC power converter possessing higher power conversion efficiency or smaller power loss. The method comprising steps of:

a) providing a primary side circuit and a secondary side circuit of the isolated DC-DC power converter,
b) optionally, coupling an input capacitor between a positive and a negative input terminal of the primary side circuit,
c) optionally, coupling a positive electrode of an output capacitor to a positive output terminal of the secondary side circuit and coupling a negative electrode of the output capacitor to a negative output terminal of the secondary side circuit,
d) providing electrical, e.g. electromagnetic, coupling of the primary side circuit and the secondary side circuit through a galvanic isolation barrier,
e) providing a resonant network configured for alternatingly being charged from an input voltage of the converter and discharged to the output capacitor through the galvanic isolation barrier in accordance with a switch control signal to produce a converter output voltage,
f) connecting, in a first case, an electrical short-circuit across the galvanic isolation barrier from the negative output terminal of the secondary side circuit to the positive input terminal of the primary side circuit or connecting, in a second case, the positive output terminal of the secondary side circuit to the negative input terminal of the primary side circuit thereby establishing in both the first case and the second case a series coupling of the output capacitor and the input capacitor,
g) coupling, in a first case, a power converter load between the positive terminal of the secondary side circuit and the positive input terminal or coupling, in the second case, the power converter load between the negative terminal of the secondary side circuit and the negative input terminal of the primary side circuit.

As mentioned above, the coupling of the input capacitor under step b) and the coupling of the output capacitor under step c) are both optional because one or both of the input and output capacitors may be formed exclusively by parasitic capacitances associated with the primary side circuit and the secondary side circuit, respectively.

The improved power conversion efficiency of the present resonant step-down DC-DC power converters is achieved because a smaller or larger amount of the output power delivered to the converter load may be transferred directly from the input voltage or power source and input capacitor of the input side circuit to the output capacitor of the secondary side circuit due to the series connection of the input and output capacitors between the input voltage or power source as explained above. Hence, a smaller amount of the output power has to be transferred through the resonant network and isolation barrier leading to lower power losses in the active and/or passive components thereof.

The method may comprise a further step of:
h) in the first case, electrically connecting an input voltage source between the negative input terminal of the primary side circuit and the positive output terminal of the secondary side circuit, or
i) in the second case, electrically connecting an input voltage source between the positive input terminal of the primary side circuit and the negative output terminal of the secondary side circuit.

The conversion of the resonant DC-DC power converter to the non-isolated resonant step-down DC-DC power converter may comprise certain further steps to add the previously discussed advantageous mode switching feature of the converted DC-DC power converter, i.e. the non-isolated resonant step-down DC-DC power converter. According to this embodiment of the conversion methodology the latter comprises further steps of:

j) inserting a rectifying element in the electrical short-circuit connection,
k) inserting a mode selecting semiconductor switch, in the first case, between the positive input terminal and the first positive electrode of the output capacitor and in second case between the negative input terminal and the second negative electrode of the output capacitor.

The skilled person will appreciate that each of the present resonant step-down DC-DC power converters may be constructed by conversion of a conventional or prior art isolated DC-DC power converter possessing a corresponding topology. The skilled person will appreciate that the conventional or prior art isolated DC-DC power converter may be step-up or boost converter delivering a higher output voltage than input voltage despite that the converted resonant step-down DC-DC power converter in accordance with the present invention delivers a lower output voltage than input voltage due to the series connection of the input capacitor and output capacitor across the input voltage source.

A third aspect of the invention relates to a resonant step-down DC-DC power converter assembly comprising:
a resonant step-down DC-DC power converter according any of the above-described embodiments thereof,
a printed circuit board having at least the resonant network integrated thereon, wherein the galvanic isolation barrier comprises a pair of magnetically coupled inductors comprising a first inductor electrically connected to the primary side circuit and a second inductor electrically connected to the secondary side circuit;
wherein the first and second inductors are formed by first and second electrical trace patterns, respectively, of the printed circuit board. The pair of magnetically coupled inductors may be coupled to each other without any magnetic permeable core material since the latter may be difficult to integrate on a printed circuit board in an efficient manner. The resonant step-down DC-DC power converter according to the latter embodiment of the invention preferably comprises a resonant converter such as class E, class DE or SEPIC converter in accordance with the present invention. The high frequency operation at or above 20 MHz makes the inductances of the first and second inductors sufficiently small to allow these to be integrally formed in the conductor pattern of the printed circuit board. Furthermore, the high switching frequency of the resonant VHF step-down DC-DC power converter as set by the frequency of the switch control signal provides a high magnetic coupling between the first and second inductors despite lack of the magnetic permeable core material. The high switching frequency of the resonant power converter provides a high magnetic coupling, as discussed above, between the pair of magnetically coupled inductors despite the lack of the magnetic permeable core material. The high magnetic coupling reduces the otherwise significant energy losses that would be incurred in the pair of magnetically coupled inductors of the galvanic isolation barrier if the resonant DC-DC power converter was operating at ordinary switching frequencies.

A fourth aspect of the invention relates to a LED light assembly, a charger assembly or a flat-screen display assembly, comprising:
a resonant step-down DC-DC power converter according any of the above-described embodiments thereof mounted on a printed circuit board of the assembly,
an AC mains voltage input connected to an input of a mains rectifier,
an output of the mains rectifier connected, in the first case, between the first positive electrode of the output capacitor and the negative input terminal of the primary side circuit or connected, in the second case, between the negative input terminal of the primary side circuit and the negative electrode of the output capacitor to directly supply a rectified mains voltage to the resonant step-down DC-DC power converter in both cases.

The LED light assembly may be mounted in housing of a LED lamp or tube. The converter load may be formed by a plurality of LEDs coupled to the converter output voltage. The AC mains voltage may lie between 110 V and 240 V depending on the electricity system. The LED lamp application is helpful to illustrate the advantages of the present resonant step-down DC-DC power converter. In one exemplary embodiment, the plurality of LEDs may need a DC voltage of about 60 V and consume 10 W. A conventional isolated step-down DC-DC power converter in the LED light assembly connected directly to U.S. mains of 110 V would be required to handle a peak rectified input voltage of about 170 V on a primary side circuit. However, the primary side circuit of the present resonant step-down DC-DC power converter is only required to handle 170 V minus 60 V (i.e. the rectified input voltage minus the output voltage of converter) which is about 110 V. This reduction of DC voltage across the primary side circuit means that smaller and cheaper components such as semiconductor switches can be used. Furthermore, the conventional isolated step-down DC-DC power converter is required to transmit the required 10 W of power to the LEDs of the lamp while the present resonant step-down DC-DC power converter only needs to transmit or supply 110/200*10 W=5.5 W. The residual 4.5 W of output power to the LED load is supplied directly from the 110 V AC mains source to the output of the converter through the mains rectifier and input capacitor.

The skilled person will appreciate that the electrical short-circuit connection across the galvanic isolation barrier provides noteworthy benefits to the present resonant step-down DC-DC power converter for example a reduction of the input voltage across the primary side circuit. These benefits are due to a marked reduction of peak AC voltage across the semiconductor switch or switches of the resonant power converters. This peak AC voltage is often about 3 times larger than the input voltage of the primary side circuit due to the resonant waveforms inside the resonant network of the resonant power converter. Furthermore, since resonant power converters rely on a resonant current, securing ZVS/ZCS operation of the semiconductor switch or switches, which scales linearly with the input voltage, the resistive power losses in components of the resonant network incurred by this resonating current scale quadratically with the resonant current. Hence, the total power loss in the resonant network scales quadratically with the input voltage. The advantages, in particular the increase of power conversion efficiency, derived from the reduction of the input voltage to the primary side circuit provided by resonant step-down DC-DC power converters in accordance with the present invention are therefore particularly pronounced for resonant converter topologies.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1A:
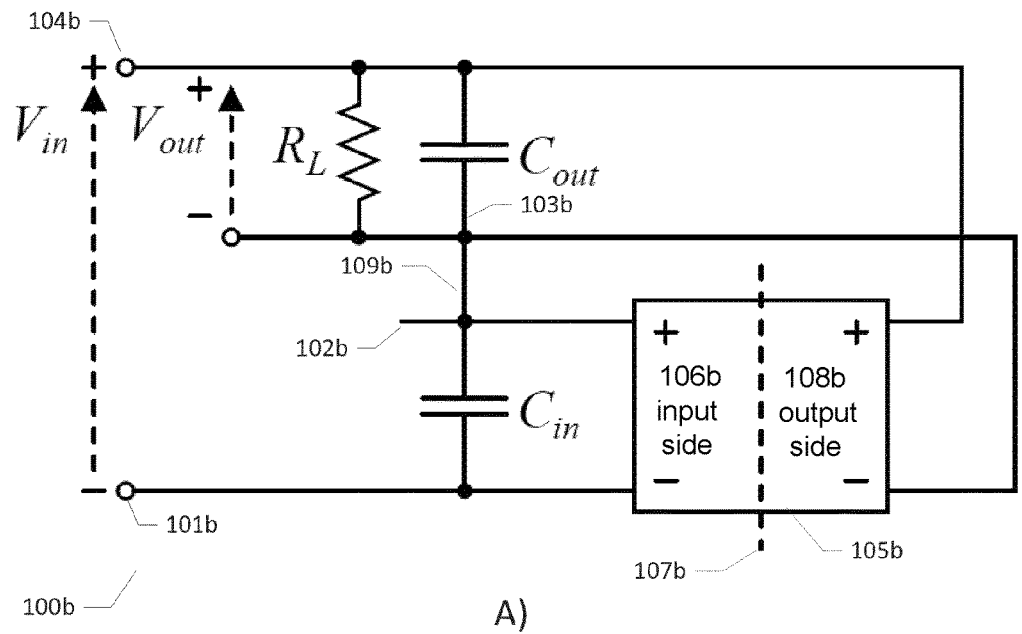
FIGS. 1A) and 1B) are simplified electrical circuit diagrams illustrating a resonant step-down DC-DC power converter in accordance with a first embodiment of the present the invention, FIG. 1C) is a simplified electrical circuit diagram of a resonant step-down DC-DC power converter in accordance with a second embodiment of the present the invention, FIG. 1D) is a simplified electrical circuit diagram of a resonant step-down DC-DC power converter in accordance with a $3^{rd}$ embodiment of the present the invention, FIG. 1E) is a simplified electrical circuit diagram of a resonant step-down DC-DC power converter in accordance with a $4^{th}$ embodiment of the present the invention, FIG. 1F) is simplified electrical circuit diagram of a first converter core that may be utilized in resonant step-down DC-DC power converter in accordance the present the invention, FIG. 1G) is simplified electrical circuit diagram of a second converter core that may be utilized in resonant step-down DC-DC power converter in accordance the present the invention, FIG. 2A) is an electrical circuit diagram of a prior art isolated class E resonant DC-DC converter comprising a series resonant circuit, FIG. 2B) is an electrical circuit diagram of a class E resonant step-down resonant DC-DC power converter comprising a series resonant circuit in accordance with a $7^{th}$ embodiment of the invention, FIG. 3A) is an electrical circuit diagram of a prior art transformer coupled isolated class E resonant DC-DC converter comprising a series resonant circuit, FIG. 3B) is an electrical circuit diagram of a transformer coupled class E resonant step-down DC-DC power converter comprising a series resonant circuit in accordance with an $8^{th}$ embodiment of the invention, FIG. 4A) is an electrical circuit diagram of a prior art isolated SEPIC converter.
Figure 1A:
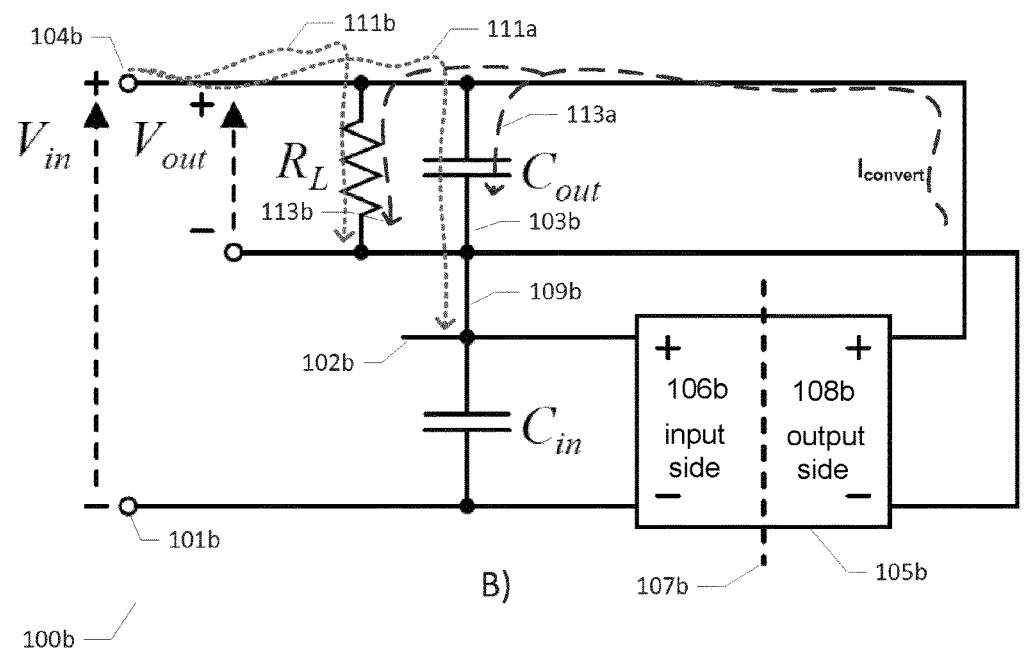
Figure 1C:
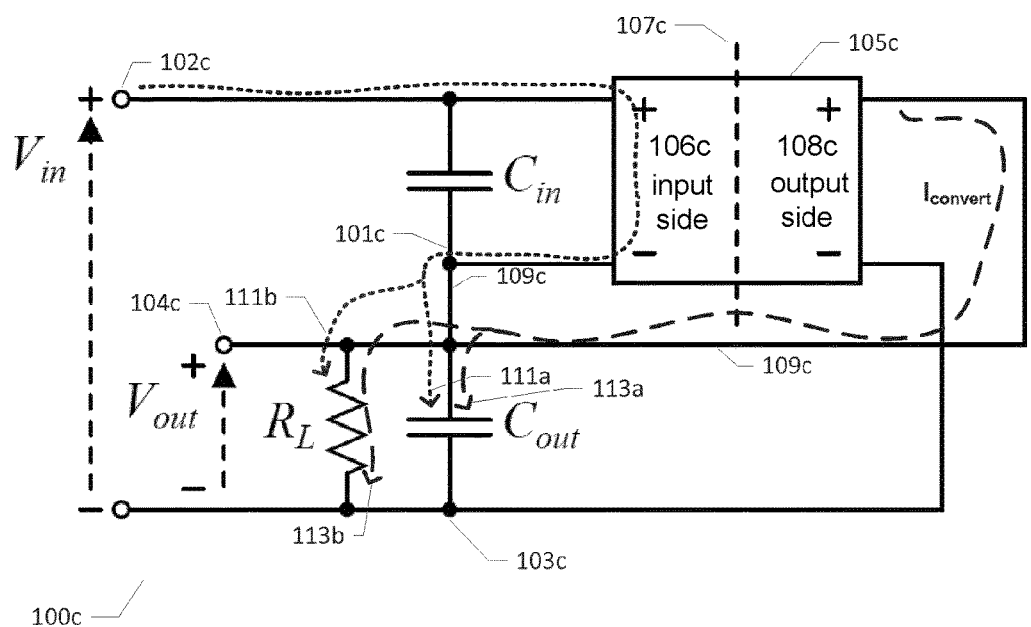

FIGS. 1A), 1B) and 1C) are simplified electrical circuit diagrams 100a, 100b, 100c illustrating basic operational features of two different embodiments of resonant step-down DC-DC power converters in accordance with the present invention. The first embodiment is illustrated on FIGS. 1A) and 1B) while the second embodiment is illustrated on FIG. 1C).

FIG. 1A) shows a resonant step-down DC-DC power converter 100b comprising a primary side circuit and a secondary side circuit connected through a galvanic isolation barrier 107b. The primary side circuit comprises a positive input terminal 102b and a negative input terminal 101b for receipt of a DC or AC input voltage $V_{in}$ from an input voltage or power source (not shown). An input capacitor $C_{in}$ is electrically connected between the positive input terminal 102b and a negative input terminal 101b to form an energy reservoir for the input power or input voltage source. The primary side circuit additionally comprises an input side 106b of a resonant network arranged in front of a galvanic isolation barrier 107. The secondary side circuit comprises an output capacitor $C_{out}$ having a first electrode electrically connected to the converter output voltage $V_{out}$ at output terminal 104b. A second electrode of the output capacitor $C_{out}$, situated at a lower voltage potential than the first electrode, is connected to the positive input terminal 102b on the input side circuit via an electrical short-circuit connection or wire 109b extending across the galvanic isolation barrier 107b. The output capacitor $C_{out}$ and input capacitor $C_{in}$ are connected in series or cascade between the DC or AC input voltage $V_{in}$, i.e. between positive and negative terminals of the input voltage or power source coupled to the output terminal 104b and the negative input terminal 101b, respectively. The skilled person will understand that the presence of the electrical short-circuit connection 109b provides the conversion from an ordinary resonant isolated DC-DC power converter to the present resonant step-down DC-DC power converter which lacks galvanic isolation between the input side circuit and the output side circuit. In this conversion process, the input voltage port of the original resonant isolated DC-DC power converter between the positive and negative terminals 102b, 101b (i.e. across $C_{in}$) is altered such that the input voltage port, for receipt of the DC or AC input voltage $V_{in}$, of the present, converted, resonant step-down DC-DC power converter 100b is arranged either between the output terminal 104b and the negative input terminal 101b in the first case or in the second case between the positive input terminal 102c and the negative electrode 103c of the output capacitor $C_{out}$ as illustrated on FIG. 1A) and FIG. 1C), respectively. The resonant step-down DC-DC power converter embodiments 100b, 100c may comprise permanently connected electrical short-circuit connections or wires 109b, 109c to provide a single mode of operation of the resonant DC-DC power converter in question with fixed voltage step-down functionality. In alternative embodiments of the present DC-DC power converters, the coupling or interconnection of the primary and secondary circuits of the power converters 100b, 100c through the electrical short-circuit connections 109b, 109c may be selectable or programmable such that each of the power converters 100b, 100c may possess two distinct and selectable modes of operation as discussed below in further detail with reference to FIGS. 1D) and 1E). The skilled person will understand that the input and output capacitors $C_{in}$ and $C_{out}$ of the resonant step-down DC-DC power converter embodiments 100b, 100c may be formed exclusively by parasitic capacitances associated with the primary side circuit and the secondary side circuit, respectively.

An electrical load $R_L$ of the step-down DC-DC converter 100b is coupled between the output terminal 104b and the positive input terminal 102b, which is across the output capacitor, such that these terminals form an output port of the DC-DC converter 100b. The primary side circuit comprises the previously discussed input side 106b of the resonant network of the step-down DC-DC converter 100b and the secondary side circuit comprises an output side 108b of the resonant network. The skilled person will appreciate that the resonant network may include numerous circuit topologies depending on the particular type of DC-DC converter in question. The resonant network preferably comprises at least one inductor for energy storage and release, but may alternatively exclusively comprise capacitors for energy storage. Generally, the resonant network is configured for alternatingly being charged from the input voltage $V_{in}$ and discharged to the output capacitor $C_{out}$ through the isolation barrier 107b in accordance with a switch control signal to produce the converter output voltage $V_{out}$. The primary side circuit preferably comprises at least one semiconductor switch, for example a MOSFET, which is switched between on-states and off-states by the switch control signal such that the input voltage is modulated in accordance with a switch control signal. The frequency of the switch control signal of the semiconductor switch arrangement which excites the resonant network may be at or above 30 MHz to form a so-called VHF type of step-down DC-DC power converter. The switch control signal may comprise a PWM modulated control signal. The primary side circuit may comprise an inductor that is charged with energy during an on-state of the least one semiconductor switch from the input capacitor $C_{in}$ and/or the DC or AC input voltage V. The inductor of the primary side circuit may subsequently be discharged through the output side 108b of the resonant network and the output capacitor $C_{out}$ in an off-state of the least one semiconductor switch. The secondary side circuit may comprise a diode based rectifier or a synchronous rectifier in front of the output capacitor to produce the converter output voltage $V_{out}$ as a DC output voltage.

While the electrical short-circuit connection or wire 109b eliminates the galvanic isolation between the primary and secondary side circuits of the resonant step-down DC-DC converter 100b by interconnecting the second electrode of the output capacitor $C_{out}$ and the positive input terminal 102b, it provides numerous new benefits to the DC-DC converter as a whole as illustrated with reference to FIG. 1B). The series connection of the output and input capacitors $C_{out}$, $C_{in}$ means that the primary side circuit only needs to withstand the converter output voltage $V_{out}$ minus the input voltage across $C_{in}$ instead of the entire DC or AC input voltage $V_{in}$ delivered by the input voltage or power source which is the situation in the prior art isolated DC-DC converter topology. The reduced voltage across the primary side circuit reduces the required maximum voltage rating of active and passive components therein leading to physically smaller and/or less costly active and passive components for example inductors, capacitors (including $C_{in}$), transistors and diodes etc. In addition, the life span of the latter components may increase by the smaller voltage stress. In the input section 106b and output section 108b, the smaller amount of power to be transferred through the DC-DC converter 100b for supplying a given amount of power to the load $R_L$ of the converter leads to reduced power requirements for active semiconductors switches allowing less costly and physically smaller semiconductors to be applied.

These beneficial reductions of the amount of power transferred through the resonant network 106b, 107b, 108b are achieved because the residual fraction of the output power supplied to the load $R_L$ is transferred directly from the DC or AC input voltage source $V_{in}$ to the output capacitor $C_{out}$ during charging of the input capacitor $C_{in}$ This power transfer mechanism is illustrated on FIG. 1B) by the first output current path $I_{convert}$ which shows how secondary side current charges the output capacitor $C_{out}$ and delivers output power to the load $R_L$ of the converter. The secondary side current comprises an AC component 113a and a DC component 113b such that the latter is dissipated in the load $R_L$. Hence, the secondary side current delivers output power passing from the source of the DC or AC input voltage $V_{in}$ and through the resonant network to the output side circuit in a conventional manner. However, the present DC-DC converter 100b also comprises a second output current path delivering current or power directly from the DC or AC input voltage source to the output capacitor $C_{out}$ and the load $R_L$ without passing through the power converter 100b. This direct current comprises an AC current component delivered to the output capacitor $C_{out}$ as illustrated by AC input current path 111a and a DC current component delivered to the load $R_L$ as illustrated by DC input current path 111b. The AC current component 111a and the DC current component 111b of the input current path passes through the short-circuit connection 109b and through the positive and negative inputs of the primary side circuit 106b such that the DC current component 111b of the direct current remains unprocessed by the converter. Hence, this DC current component is supplied directly to the load $R_L$ without any noticeable power loss.

The skilled person will appreciate that a practical electrical short circuit connection 109b will possess a certain DC resistance and an upper limit for this DC resistance will vary depending on input/output voltage and/or current requirements of the converter 100b. The electrical short-circuit connection may possess a DC resistance of less than 1 kΩ, even more preferably less than 100Ω, such as less than 10Ω. In other embodiments, the electrical short circuit connection 109b may have a unidirectional resistance such that the DC resistance only falls below the above-mentioned upper limits in one direction and exhibits a much larger DC resistance in the opposite direction, i.e. a diode characteristic.

In the alternative embodiment of the resonant step-down DC-DC converter topology illustrated on FIG. 1), the electrical short-circuit connection or wire 109c extending across the isolation barrier 107c is connecting the first positive electrode of the output capacitor $C_{out}$ to the negative input terminal 101c of the primary side circuit. Thereby, a series coupling of the output capacitor $C_{out}$ and the input capacitor $C_{in}$ from the input voltage $V_{in}$ at the positive input terminal 102c to the negative electrode 103c of the output capacitor $C_{out}$ is established. The negative electrode 101c of the output capacitor $C_{out}$ is at a lower electric potential than the negative input terminal 101c. In this manner, the DC or AC input voltage $V_{in}$ to the power converter 100c is once again applied across the series connected input and output capacitors $C_{in}$ and $C_{out}$. The converter load $R_L$ is coupled between the output terminal 104c and the terminal 103c which also is across the output capacitor. Otherwise, circuit functions, electrical component characteristics and component values of this second embodiment of resonant power converter 100c may be identical to those of the first embodiment of the resonant power converter 100b.

Figure 1D:
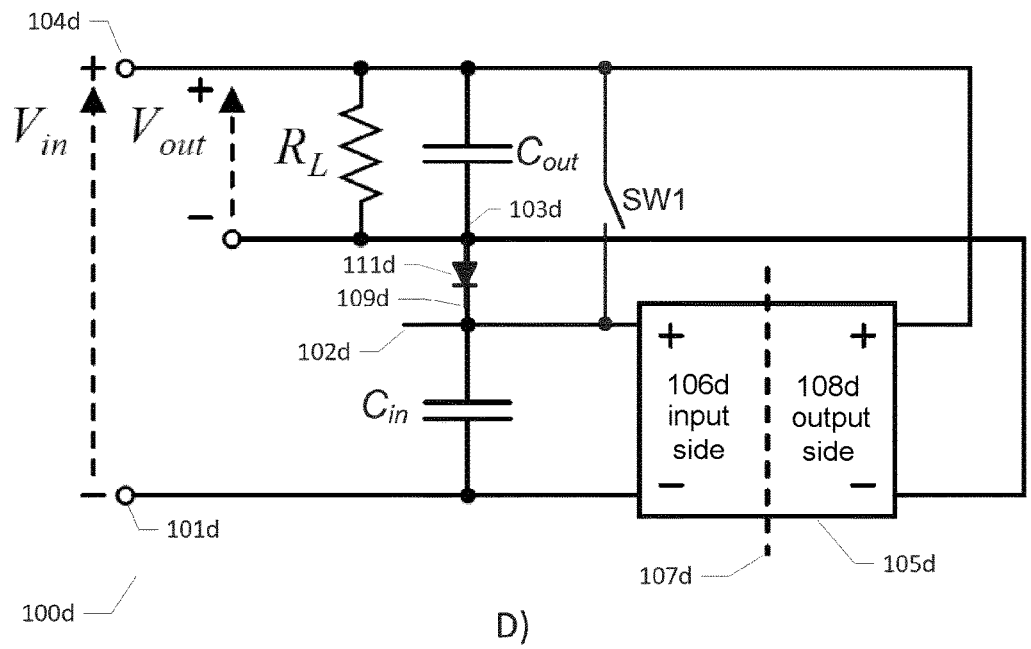
Figure 1D:
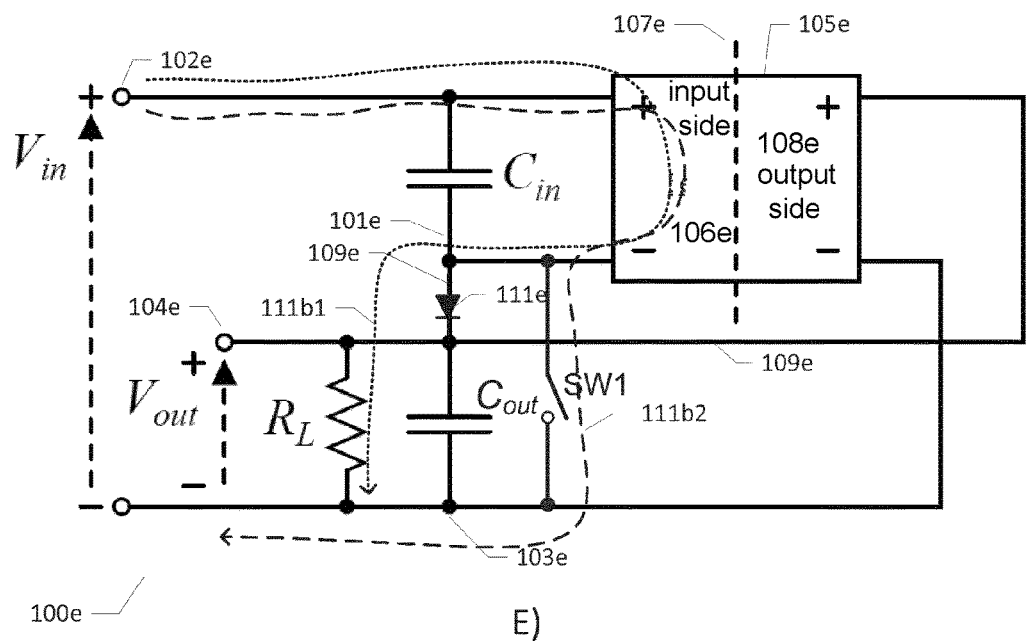

FIG. 1D) is a simplified electrical circuit diagram of a resonant step-down DC-DC power converter 100d in accordance with a third embodiment of the present the invention. A converter core 105d of the resonant power converter 100d may be identical to the core 105b of the resonant power converter 100c discussed above in connection with FIGS. 1A) and 1B). Hence, corresponding features of these different power converter embodiments 100b, 100d have been provided with corresponding reference numerals/symbols to assist comparison. The present resonant power converter embodiment 100d comprises a mode selecting controllable semiconductor switch SW1 operating in conjunction with a rectifying element 111e such as a diode or an active semiconductor diode such as a controllable semiconductor switch. The operation of the resonant step-down DC-DC power converter 100d corresponds to the operation of the resonant step-down DC-DC power converter 100e discussed in detail below.

FIG. 1E) shows a simplified electrical circuit diagram of a resonant step-down DC-DC power converter 100e in accordance with a $4^{th}$ embodiment of the present the invention. A converter core 105e of the resonant power converter 100e may be identical to the core 105 of the resonant power converter 100c discussed above in connection with FIG. 1C). Hence, corresponding features of these different power converter embodiments 100c, 100e have been provided with corresponding reference numerals/symbols to assist comparison. The present resonant power converter embodiment 100e comprises a mode selecting controllable semiconductor switch SW1 operating in conjunction with a rectifying element 111e such as a diode or an active semiconductor diode such as a controllable semiconductor switch. The rectifying element 111e is inserted in a short-circuit connection or wire 109e which connects a negative input terminal 109e of the power converter to a first positive electrode of the output capacitor $C_{out}$. The latter short-circuit connection corresponds to the short circuit connection 109c of the previously discussed resonant power converter 100c. Hence, when the rectifying element 111e is forward biased the short-circuit wire 109e effectively places the output capacitor $C_{out}$ and input capacitor $C_{in}$ is series, albeit possibly with a minor diode voltage drop, between the input voltage $V_{in}$ terminals 104e, 103e of the resonant power converter 100e. On the other hand, when the rectifying element 111e is reversely biased the series coupling of $C_{out}$ and $C_{in}$ through short-circuit wire 109e is broken or disconnected to break the electrical connection between the primary side circuit and the secondary side circuit of the resonant power converter 100e.

The mode selecting controllable semiconductor switch SW1 is coupled between the negative input terminal 101e and the second negative electrode of the output capacitor 103e and configured to selectively break and close the electrical connection between these terminals 101e, 103e. The switch SW1 may comprise one or more BJT(s), FET(s) MOSFET(s) or IGBT(s) such as a Gallium Nitride (GaN) or Silicon Carbide (SiC) transistor. SW1 may be switched between a conducting or ON state and non-conducting or OFF state to connect and break, respectively, the electrical connection between terminals 101e, 103e by a suitable control voltage applied on a gate or base terminal of the switch SW1. A mode controlling circuit (not shown) integrated with or coupled to the present resonant power converter 100e may supply this control voltage to SW1.

When the mode selecting controllable semiconductor switch SW1 is placed in the non-conducting or OFF state (as illustrated) the negative terminals of the $C_{out}$ and $C_{in}$ capacitors are disconnected and the rectifying element 111e forward biased. Hence, the input and output capacitors $C_{out}$ and $C_{in}$ are series connected through the rectifying element 111e. The rectifying element 111e is forward biased because the DC or AC input voltage $V_{in}$ is larger than the output voltage $V_{out}$ allowing the previously discussed input current of the power converter to flow directly through $C_{in}$ and into $C_{out}$ to charge the output capacitor. Hence, the resonant power converter 100e is placed in a first mode of operation where it largely functions as the resonant power converter 100c of FIG. 1C) discussed above, i.e. as a resonant step-down non-isolated DC-DC power converter. By placing the controllable semiconductor switch SW1 in the conducting or ON state, the present resonant power converter embodiment 100e is switched to the second mode of operation. In the second state of operation, the rectifying element 111e is reversely biased and hence non-conducting due to the electrical connection between the negative capacitor terminals 101e, 103e. Hence, the above-discussed series connection (through the rectifying element 111e) of the input and output capacitors $C_{out}$ and $C_{in}$ in the first mode is broken or opened. In this second mode of operation of the resonant power converter 100e, it largely functions as an ordinary resonant DC-DC power converter albeit still without any galvanic isolation between the primary and secondary side circuits because of the presence of the rectifying element 111e.

The mode switching feature, i.e. from the first mode to the second mode or vice versa, of the present resonant power converter 100e is accompanied with several advantages. The mode switching feature may be used to dynamically switch the present resonant power converter 100e between the first and second modes during operation of the converter 100e by appropriate control of the control terminal of SW1. The dynamic mode switching feature increases the input voltage range of the resonant power converter 100e. To illustrate these advantages consider an ordinary resonant DC-DC power converter designed for a DC input voltage range of 10-20 V and a DC output voltage range of 10 V. If this ordinary DC-DC power converter is converted or configured as the present resonant step-down DC-DC power converter, the DC input voltage range may be increased to 10-30 V by utilizing both the first mode and second mode of the resonant step-down DC-DC power converter during operation of the converter. Hence, the resonant step-down DC-DC power converter is switched dynamically between the first and second modes of operation in accordance with the input voltage waveform. The increase of DC input voltage range achieved by the dynamic mode switching feature is particular advantageous because resonant power converters generally suffer from a restricted or narrow DC input voltage range compared to non-resonant DC-DC power converters. Another advantage of the dynamic mode switching feature is an improved power factor (PF) of the resonant power converter 100e. The power factor of a switched mode power converter or supply is an important performance metric in numerous applications such as LED lamps where regulatory requirements for minimum power factor, such as larger than 0.9, may exist. The improved PF is achieved by the dynamic mode switching feature because this feature allows the converter to track AC variations of the input voltage to the converter such as the AC variations in the waveform of a rectified 50/60 Hz mains voltage.

The flow of input current in the resonant step-down DC-DC power converter 100e in the first and second modes of operation is illustrated by a first DC input current path 111b1 and a second DC input current path 111b2. When the first mode of operation of the converter 100e is selected, i.e. the step-down functionality, the input current flows through the first DC input current path 111b1 where DC input current flows through the diode 111e and through the converter load $R_L$. When the second mode of operation of the converter 100e is selected, i.e. SW1 is conducting and ordinary conversion functionality, the input current flows through the second DC input current path 111b2 where the diode 111e is blocking and the DC input current flows through SW1 to the negative rail or terminal 103d of the converter without passing through the converter load.

Figure 1F:
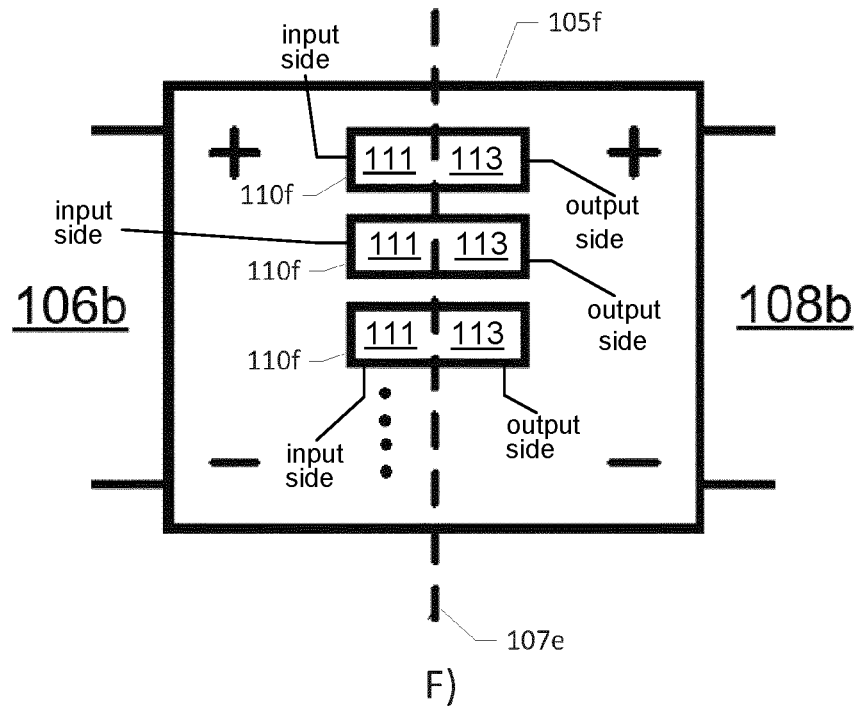
Figure 1F:
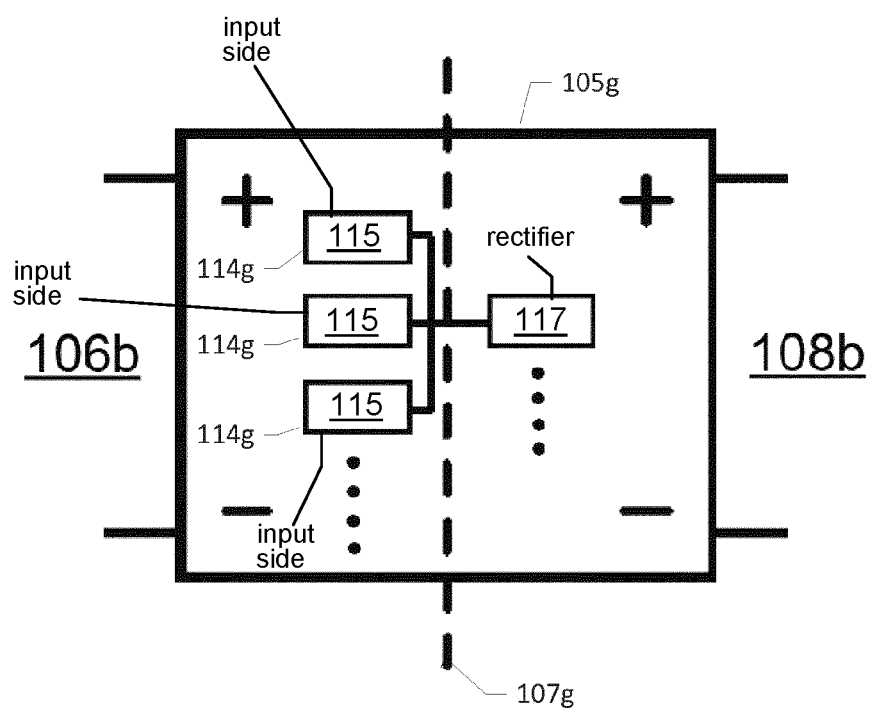

FIG. 1F) is a simplified electrical circuit diagram of a first converter core 105f that may be utilized as converter core 105b, 105c, 105d, 105e of each of the step-down DC-DC power converter embodiments 100b, 100c, 100d, 100e, illustrated on FIGS. 1A), 1B), 1C), 1D) and 1E), respectively. The first converter core 105f comprises a plurality of separate resonant DC-DC power converter cores 110f. Each of the separate resonant DC-DC power converter cores 110f comprises an input side 111 of a resonant network coupled to an output side 113 of the resonant network through a galvanic isolation barrier 107f. The input sides 111 of the resonant DC-DC power converter cores 110e may be connected in parallel or series. The output sides 113 of the resonant DC-DC power converter cores 110f may likewise be connected in parallel or series. The parallelization of the plurality of input sides 111 and/or the parallelization of the one or more output sides 113 increases the power rating of a step-up DC-DC power converter utilizing the first converter core 105f. The skilled person will understand that each of the separate resonant DC-DC power converter cores 110f may comprise one of the prior art resonant DC-DC power converter cores discussed below with reference to FIGS. 2, 3 and 4.

FIG. 1G) is simplified electrical circuit diagram of a second converter core 105g that may be utilized as converter core 105b, 105c, 105d, 105e of each of the step-down DC-DC power converter embodiments 100b, 100c, 100d, 100e illustrated on FIGS. 1A), 1B), 1C), 1D) and 1E), respectively. The second converter core 105g comprises a plurality of separate resonant power inverters 114g. Each of the separate resonant power inverter cores 114g comprises an input side 115 of a resonant network coupled to one or more rectifier(s) 117 of the resonant DC-DC power converter core 105g through a galvanic isolation barrier 107g. The separate resonant power inverter cores 114g may be connected in parallel or series. Likewise, the respective output side of the one or more rectifier(s) 117 may also be connected in series or parallel. However, galvanic isolation may be inserted between the one or more rectifier(s) 117 if these are coupled in series.

Figure 2A:
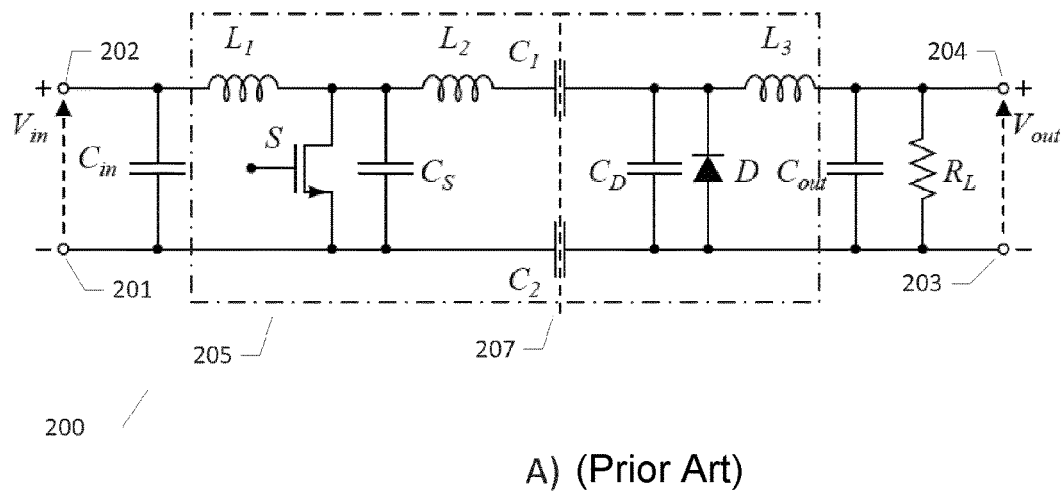
Figure 2A:
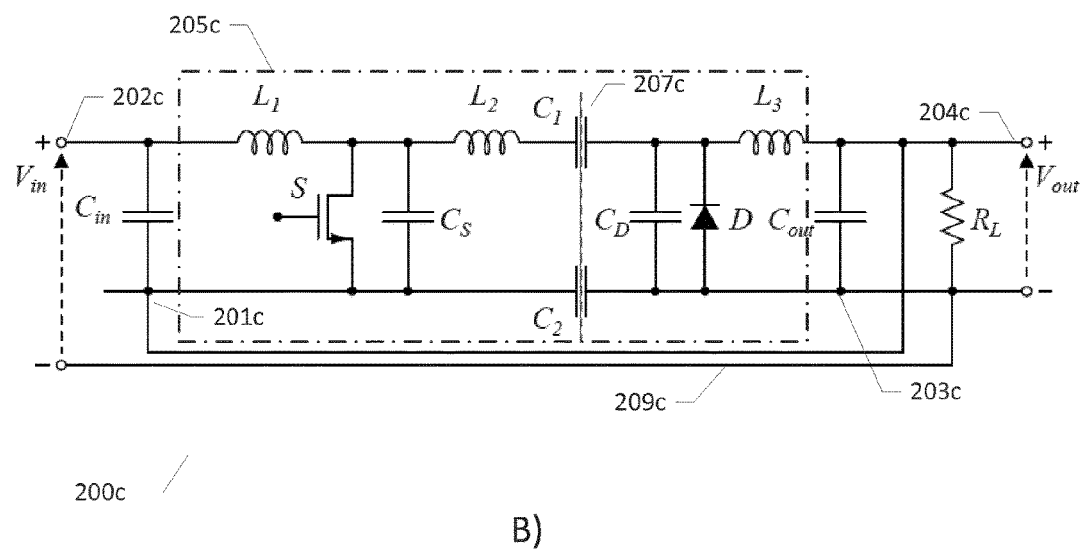

FIG. 2A) shows an electrical circuit diagram of a prior art isolated class E resonant DC-DC converter 200 comprising a series resonant network or circuit including inductor $L_2$ and capacitor $C_1$. The prior art class E resonant converter comprises a primary side circuit and a secondary side circuit connected through a galvanic isolation barrier 207. The primary side circuit comprises a positive input terminal 202 and a negative input terminal 201 for receipt of a DC or AC input voltage $V_{in}$ from a voltage or power source (not shown). An input capacitor $C_{in}$ is electrically connected between the positive input terminal 202b and a negative input terminal 201 to form an energy reservoir for the voltage source. A converter core 205 comprises a resonant network which includes first and second series connected inductors $L_1$ and $L_2$ and a semiconductor switch arrangement comprising a MOSFET switch S (or another suitable type of semiconductor switch) with a drain terminal connected to a midpoint node between the $L_1$ and $L_2$. The primary side circuit is arranged in front of an isolation barrier 207 formed by coupling capacitors $C_1$ and $C_2$. The secondary side circuit comprises an output capacitor $C_{out}$ having a first electrode electrically connected to the converter output voltage $V_{out}$ at output terminal 204. A second negative electrode of the output capacitor $C_{out}$ is coupled to a negative terminal 203 of the converter output voltage. A load of the isolated class E resonant DC-DC converter 200 is schematically illustrated by load resistor $R_L$ and coupled between the positive and negative output terminals 204, 203.

FIG. 2B) is an electrical circuit diagram of a class E resonant step-down DC-DC power converter 200c comprising a series resonant circuit in accordance with a $7^{th}$ embodiment of the invention. The class E resonant step-down DC-DC power converter 200b may be obtained by conversion of the above-mentioned prior art isolated class E resonant DC-DC converter 200 by inserting or adding an electrical short circuit connection 209c extending across a galvanic isolation barrier 207c of the converter 200c. The galvanic isolation barrier 207c comprises series capacitors $C_1$ and $C_2$. The electrical short circuit connection 209c electrically connects the negative input terminal 201c and the first positive electrode 204c of the output capacitor $C_{out}$. The first positive electrode 204c is also connected to the converter output voltage $V_{out}$. As discussed in connection with FIG. 1C), the electrical short-circuit connection or wire 209c effectively places the output capacitor $C_{out}$ and input capacitor $C_{in}$ in series or cascade across the DC or AC input voltage V. Hence, the converter load, schematically illustrated by the load resistor $R_L$, is coupled in parallel across the output capacitor $C_{out}$. The skilled person will understand that the series capacitor $C_2$ of the galvanic isolation barrier 207c prevents DC current from flowing from the second negative electrode 203b of the output capacitor $C_{out}$ and back to the negative input terminal 201c. In this manner, the DC current is directed or forced through the electrical short circuit connection 209b and back through the input capacitor $C_{in}$. In this manner, despite being electrically by-passed by the conversion, the isolation barrier 207c is important for the operation of the present class E resonant step-down DC-DC power converter 200c as otherwise would nodes 201c and 203c and 204c be directly electrically connected causing a short circuit at the converter input.

The series resonant network of the converter core 205c of the converter 200c may, in addition to the above-discussed first and second series connected inductors $L_1$ and $L_2$, comprise a capacitor ($C_S$) arranged across drain and source terminals of the MOSFET switch S to increase a resonant current and/or adjust/fine-tune a resonance frequency of the power converter 200c. Likewise, a yet further capacitor $C_D$ may be arranged across the rectifying diode D to adjust a duty cycle of the secondary part of the power converter 200c, i.e. the class E rectifier. During operation of the converter 200c, the series resonant network is excited by the MOSFET switch S such that the series resonant network is alternatingly charged from the DC or AC input voltage $V_{in}$ and discharged to the output capacitor $C_{out}$ through the galvanic isolation barrier 207c and through a rectification circuit comprising inductance $L_3$ and diode D.

Figure 3A:
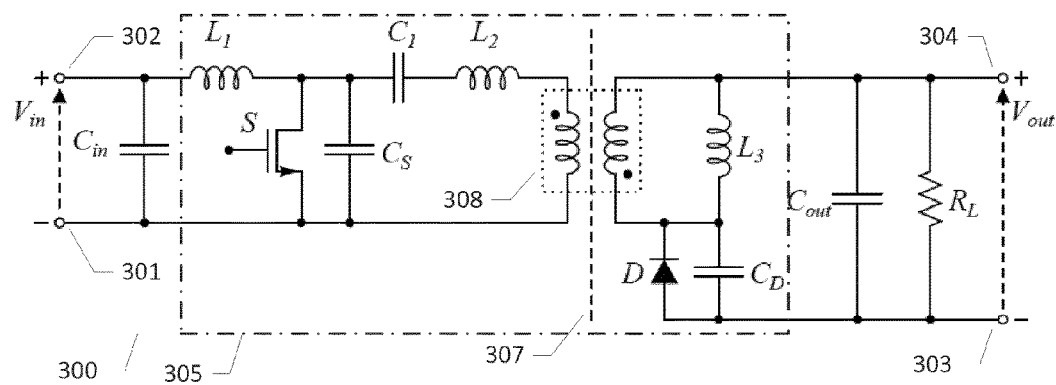
Figure 3A:
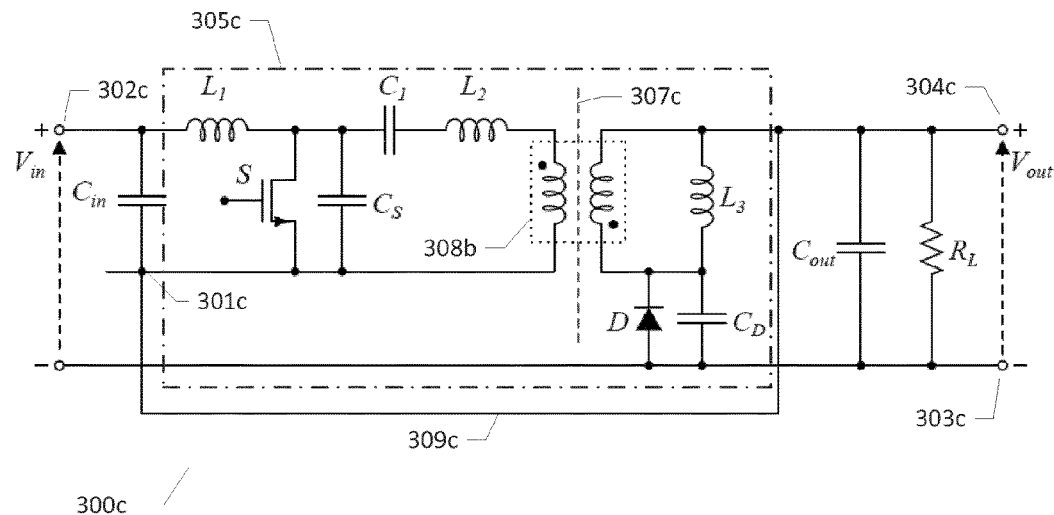

FIG. 3A) is an electrical circuit diagram of a prior art transformer isolated class E resonant DC-DC converter 300 comprising a series resonant circuit. A converter core 305 of the converter 300 comprises a series resonant circuit which at least inductors $L_2$, $L_3$ and capacitors $C_S$ and $C_1$. The prior art DC-DC converter 300 comprises a primary side circuit and a secondary side circuit connected through a galvanic isolation barrier 307 provided by the transformer 308. The primary side circuit comprises a positive input terminal 302 and a negative input terminal 301 for receipt of a DC or AC input voltage $V_{in}$ from a voltage or power source (not shown). An input capacitor $C_{in}$ is electrically connected between the positive input terminal 302 and a negative input terminal 301 to form an energy reservoir for the input voltage source. The primary side circuit additionally comprises a portion of a series resonant network or circuit which at least comprises inductors $L_2$ and capacitors $C_S$ and $C_1$. A first inductor $L_1$ has a first end coupled to the positive input terminal 302 and a second end to a drain terminal of a MOSFET switch S which forms a switch arrangement of the present power converter 300. A secondary side circuit of the power converter 300 comprises an output capacitor $C_{out}$ having a first electrode electrically connected to the converter output voltage $V_{out}$ at output terminal 304. A second negative electrode of the output capacitor $C_{out}$ is coupled to a negative terminal 303 of the converter output voltage. An electrical or power converter load is schematically illustrated by load resistor $R_L$ and coupled between the positive and negative output terminals 304, 303 of the prior art DC-DC converter 300. The secondary side circuit furthermore comprises the third inductor $L_3$ connected across a secondary transformer winding of the above-mentioned transformer 308. The secondary transformer winding has a first end coupled to a cathode of rectifying diode D and a second end coupled to the positive electrode of the output capacitor $C_{out}$. The rectifying diode D rectifies AC current generated by the secondary transformer winding and generates a DC voltage as the converter output voltage between the positive and negative output terminals 304, 303. An electrical or power converter load is schematically illustrated by load resistor $R_L$ coupled between the positive and negative output terminals 304, 303.

FIG. 3B) is an electrical circuit diagram of a transformer coupled class E resonant step-down DC-DC power converter 300c in accordance with an $8^{th}$ embodiment of the invention. The step-down DC-DC power converter 300c may be obtained by conversion of the above-mentioned prior art resonant isolated DC-DC converter 300 by inserting or adding an electrical short circuit connection 309c extending across a galvanic isolation barrier formed by the transformer 308b. The transformer 308b comprises magnetically coupled primary and secondary transformer windings with the polarity inversion indicated by the black dots at the top of the windings. A converter core 305c of the converter 300 comprises a series resonant network or circuit which at least comprises inductors $L_2$, $L_3$ and capacitors $C_S$ and $C_1$. During operation of the converter 300c, the series resonant network is excited by the MOSFET switch S such that the series resonant network is alternatingly charged from the DC or AC input voltage $V_{in}$ and discharged to the output capacitor $C_{out}$ through the galvanic isolation barrier 307c and through a rectification circuit comprising diode D.

The electrical short circuit connection 309c connects the negative input terminal 302b of the primary side circuit and the first positive electrode 304c of the output capacitor $C_{out}$ where the latter electrode also supplies the converter output voltage. As discussed in connection with FIG. 1C), the electrical short-circuit connection or wire 309c effectively places the output capacitor $C_{out}$ and input capacitor $C_{in}$ is series or cascade across the positive and negative connections to the DC or AC input voltage V. Hence, the converter load, schematically illustrated by the load resistor $R_L$, is coupled between the converter output voltage across the positive and negative electrodes of the output capacitor $C_{out}$. The skilled person will understand that the transformer coupling prevents DC current from flowing from the second negative electrode 303c of the output capacitor $C_{out}$ and back to the negative input terminal 301c of the primary side circuit.

Figure 4A:
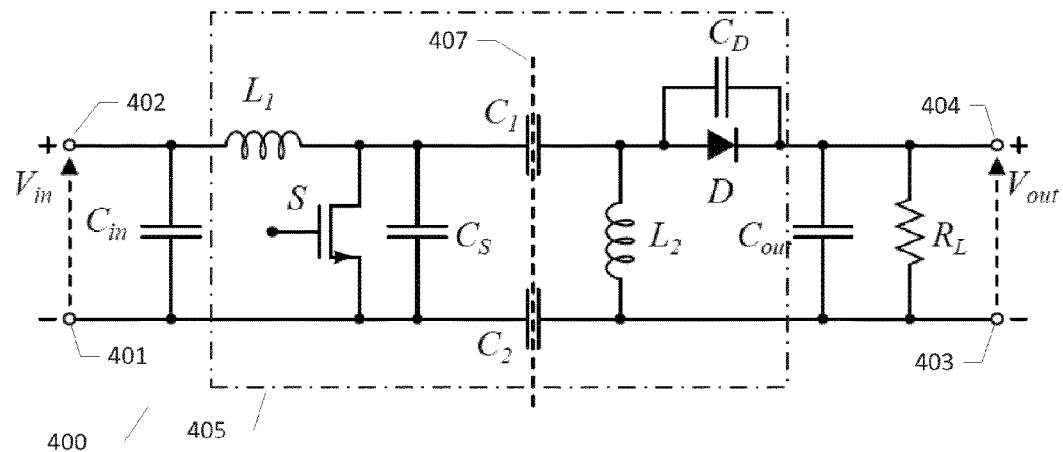
FIG. 4B) is an electrical circuit diagram of a step-down SEPIC resonant DC-DC converter in accordance with a $9^{th}$ embodiment of the invention.
Figure 4A:
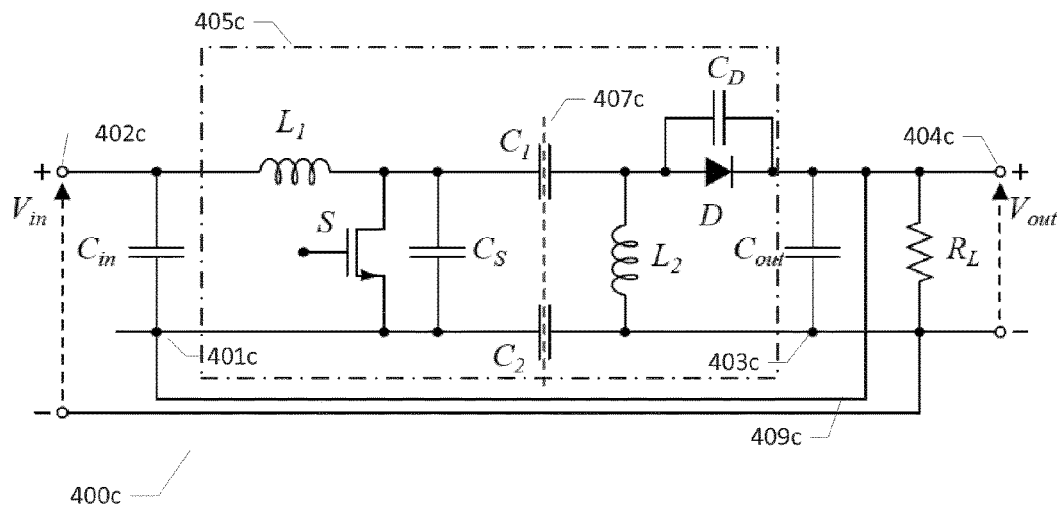

FIG. 4A) is an electrical circuit diagram of a prior art isolated single-ended primary-inductor converter (SEPIC) 400. The prior art SEPIC 400 comprises a primary side circuit and a secondary side circuit connected through a galvanic isolation barrier 407. The primary side circuit comprises a positive input terminal 402 and a negative input terminal 401 for receipt of a DC or AC input voltage $V_{in}$ from a voltage or power source (not shown). An input capacitor $C_{in}$ is electrically connected between the positive input terminal 402 and a negative input terminal 401 to form an energy reservoir for the input voltage source. A converter core 405 of the converter 400 comprises a series resonant circuit which includes a first inductor $L_1$ having first node coupled to the DC or AC input voltage $V_{in}$ and a second node coupled to a drain terminal of a MOSFET switch S. A source terminal of a MOSFET switch S of a switch arrangement is coupled to the negative input terminal 401. The prior art SEPIC 400 is a resonant type of power converter wherein a resonance frequency of the converter is determined by the resonant network of the converter core 405 comprising the first and second inductors $L_1$, $L_2$ and the capacitors $C_S$ and $C_D$. The primary side circuit is arranged in front of a galvanic isolation barrier 407 within the converter core 405 and formed by coupling capacitors $C_1$ and $C_2$. The secondary side circuit comprises an output capacitor $C_{out}$ having a first electrode electrically connected to the converter output voltage $V_{out}$ at a positive output terminal 404. A second negative electrode of the output capacitor $C_{out}$ is coupled to a negative terminal 403 of the converter output voltage. A rectifying diode D rectifies AC current generated by a second inductor $L_2$ and charges the output capacitor $C_{out}$ such that the converter output voltage $V_{out}$ between the positive and negative output terminals 404, 403 is a DC voltage. A converter load of the SEPIC 400, illustrated by load resistor $R_L$ is coupled between the positive and negative output terminals 404, 403.

FIG. 4B) is an electrical circuit diagram of a SEPIC 400c in accordance with a 9$^{th}$ embodiment of the invention. The SEPIC 400c may be obtained by conversion of the above-mentioned prior art SEPIC 400 by inserting or adding an electrical short circuit connection 409c extending across a galvanic isolation barrier 407c of the SEPIC 400c. The galvanic isolation barrier 407c comprises series capacitors $C_1$ and $C_2$ which prevent the flow of DC current between the secondary side circuit and the primary side circuit in the isolated SEPIC 400 discussed above. In the present SEPIC 400c, the electrical short circuit connection 409c electrically connects the negative input terminal 401c and the positive electrode 404c of the output capacitor $C_{out}$. As discussed in connection with FIGS. 1A) and 1B), the electrical short-circuit connection or wire 409c effectively places the output capacitor $C_{out}$ and input capacitor $C_{in}$ is series or cascade across the positive and negative connections to the DC or AC input voltage $V_{in}$ such that the galvanic isolation between the primary and secondary side circuits is bypassed or eliminated. The electrical or power converter load, schematically illustrated by the load resistor $R_L$, is coupled between the converter output voltage $V_{out}$ at the output terminal 404c and the negative electrode 403c of the output capacitor. The skilled person will understand that the series capacitor $C_2$ of the galvanic isolation barrier 407b prevents DC current from flowing from the second negative electrode 403b of the output capacitor $C_{out}$ and directly back to the negative input terminal 401b of the primary side circuit. The SEPIC 400c comprises a converter core 405c comprises a resonant network as discussed above comprising first and second inductors $L_1$, $L_2$ and capacitors $C_S$ and $C_D$. During operation of the converter 400c, the series resonant network is excited by the MOSFET switch S such that the series resonant network is alternatingly charged from the DC or AC input voltage $V_{in}$ and discharged to the output capacitor $C_{out}$ through the galvanic isolation barrier 407c and through a rectification circuit comprising a rectifying diode D. The capacitor $C_S$ connected or arranged across drain and source terminals of the MOSFET switch S is optional, but may be helpful to increase a resonant current and/or adjust/fine-tune a resonance frequency of the resonant network SEPIC 400c. In some embodiments of the SEPIC 400c the capacitor $C_S$ may be formed exclusively by a parasitic capacitance of the MOSFET S. The optional capacitor $C_D$ may be arranged across the rectifying diode D to adjust a duty cycle of the power converter 400c.

The invention claimed is:

1. A resonant step-down DC-DC power converter comprising:
   a primary side circuit and a secondary side circuit coupled through a capacitor based galvanic isolation barrier,
   the primary side circuit comprising a positive input terminal and a negative input terminal for receipt of an input voltage and an input capacitor coupled between the positive and negative input terminals,
   the secondary side circuit comprising an output capacitor chargeable to a converter output voltage between a first positive electrode and a second negative electrode of the output capacitor,
   a resonant network configured for alternatingly being charged from the input voltage and discharged to the output capacitor through the galvanic isolation barrier by a semiconductor switch arrangement in accordance with a switch control signal to produce the converter output voltage,
   an electrical short-circuit connection across the galvanic isolation barrier connecting, in a first case, the second negative electrode of the output capacitor to the positive input terminal of the primary side circuit or, in a second case, connecting the second positive electrode of the output capacitor to the negative input terminal of the primary side circuit thereby establishing in both the first and second cases a series coupling of the output capacitor and the input capacitor, and
   a load connection, in the first case, between the first positive electrode of the output capacitor and the positive input terminal or, in the second case, between the second negative electrode of the output capacitor and the negative input terminal.

2. The resonant step-down DC-DC power converter according to claim 1, wherein the galvanic isolation barrier comprises:
   a pair of magnetically coupled inductors comprising a first inductor electrically connected to the primary side circuit and a second inductor electrically connected to the secondary side circuit.

3. The resonant step-down DC-DC power converter according to claim 2, wherein the first and second inductors are wound around a common magnetically permeable structure to form an isolation transformer.

4. The resonant step-down DC-DC power converter according to claim 2, wherein the first and second inductors are arranged to be magnetically coupled without a common magnetically permeable structure to form a coreless isolation transformer.

5. The resonant step-down DC-DC power converter according to claim 4, wherein the first and second inductors comprise first and second embedded coils, respectively, formed in one or more conductive layers of a printed circuit board.

6. The resonant step-down DC-DC power converter according to claim 4, wherein a magnetic coupling factor, k, between the first and second inductors is larger than 0.25.

7. The resonant step-down DC-DC power converter according to claim 1, wherein the galvanic isolation barrier comprises:
   a first capacitor coupled in series with the positive input terminal of the primary side circuit and the first positive electrode of the output capacitor; and
   a second capacitor coupled in series with the negative input terminal of the primary side circuit and the second negative electrode of the output capacitor.

8. The resonant step-down DC-DC power converter according to claim 7, wherein a capacitance of each of the first and second capacitors is smaller than 100 nF.

9. The resonant step-down DC-DC power converter according to claim 1, wherein a DC resistance of the electrical short-circuit connection is less than 1 kΩ.

10. The resonant step-down DC-DC power converter according to claim 1, wherein the resonant network comprises:
    first and second series connected inductors connected in series with the positive input voltage terminal,
    a semiconductor switch having a first switch node connected between a mid-point node between the first and second series connected inductors, a second switch node connected to the negative input terminal of the primary side circuit and a control terminal connected to the switch control terminal; and
    a rectifying circuit connected between the first and second capacitors of the galvanic isolation barrier and the first positive electrode and the second negative electrode of the output capacitor.

11. The resonant step-down DC-DC power converter according to claim 1, wherein the semiconductor switch arrangement comprises one or more controllable semiconductor switches.

12. The resonant step-down DC-DC power converter according to claim 11, wherein the one or more controllable semiconductor switches are configured for zero-voltage-switching and/or zero-current-switching.

13. A step-down DC-DC power converter assembly comprising:
    the resonant step-down DC-DC power converter according to claim 1,
    a printed circuit board having at least the resonant network mounted thereon, and
    a pair of magnetically coupled inductors comprising a first inductor electrically connected to the primary side circuit and a second inductor electrically connected to the secondary side circuit;
    wherein the first and second inductors are formed by first and second electrical trace patterns, respectively, of the printed circuit board.

14. A LED light assembly comprising:
    the resonant step-down DC-DC power converter according to claim 1 mounted on a printed circuit board of the assembly,
    an AC mains voltage input connected to an input of a mains rectifier,
    an output of the mains rectifier connected, in the first case, between the first positive electrode of the output capacitor and the negative input terminal or connected, in the second case, between the negative input terminal and the negative electrode of the output capacitor to supply a rectified mains voltage to the resonant step-down DC-DC power converter in both cases.

15. A LED lamp comprising the LED light assembly according to claim 14.

16. The resonant step-down DC-DC power converter according to claim 1, wherein the switch control signal has a frequency at or above 20 MHz.

17. The resonant step-down DC-DC power converter according to claim 1 further comprising:
    a rectifying element configured to:
        in the first case conduct current from the positive input terminal to the second negative electrode of the output capacitor in the second case, conduct current from the negative input terminal to the first positive electrode of the output capacitor; and
    a mode selecting semiconductor switch configured to, in the first case, selectively break and close an electrical connection between the positive input terminal and the first positive electrode of the output capacitor and in second case selectively break and close an electrical connection between the negative input terminal and the second negative electrode of the output capacitor, such that:
        in a first mode of the resonant step-down DC-DC power converter, establishing the series connection of the output capacitor and the input capacitor through the rectifying element; and
        in a second mode of the resonant step-down DC-DC power converter, opening or breaking the series coupling of the output capacitor and the input capacitor.

18. A method of converting a resonant isolated DC-DC power converter to a resonant non-isolated step-down DC-DC power converter possessing higher power conversion efficiency, said method comprising:
    a) providing a primary side circuit and a secondary side circuit of the isolated DC-DC power converter,
    b) optionally, coupling an input capacitor between a positive and a negative input terminal of the primary side circuit,
    c) optionally, coupling a positive electrode of an output capacitor to a positive output terminal of the secondary side circuit and coupling a negative electrode of the output capacitor to a negative output terminal of the secondary side circuit,
    d) providing electrical coupling of the primary side circuit and the secondary side circuit through a capacitor based galvanic isolation barrier,
    e) providing a resonant network configured for alternatingly being charged from an input voltage of the converter and discharged to the output capacitor through the galvanic isolation barrier in accordance with a switch control signal to produce a converter output voltage,
    f) connecting, in a first case, an electrical short-circuit across the galvanic isolation barrier from the negative output terminal of the secondary side circuit to the positive input terminal of the primary side circuit or connecting, in a second case, the positive output terminal of the secondary side circuit to the negative input terminal of the primary side circuit thereby establishing in both the first case and the second case a series coupling of the output capacitor and the input capacitor, and
    g) coupling, in a first case, a power converter load between the positive terminal of the secondary side circuit and the positive input terminal or coupling, in the second case, the power converter load between the negative terminal of the secondary side circuit and the negative input terminal of the primary side circuit.

19. The method of converting an isolated DC-DC power converter according to claim 18, further comprising:
   in the first case, electrically connecting an input voltage source between the negative input terminal of the primary side circuit and the positive output terminal of the secondary side circuit, or
   in the second case, electrically connecting an input voltage source between the positive input terminal of the primary side circuit and the negative output terminal of the secondary side circuit.

20. The method of converting an isolated DC-DC power converter according to claim 18, further comprising:
   inserting a rectifying element in the electrical short-circuit connection, and
   inserting a mode selecting semiconductor switch, in the first case, between the positive input terminal and the first positive electrode of the output capacitor and in second case between the negative input terminal and the second negative electrode of the output capacitor.

21. The method of converting an isolated DC-DC power converter according to claim 18, wherein the switch control signal has a frequency at or above 20 MHz.

* * * * *